(12) United States Patent
Fall

(10) Patent No.: US 7,458,264 B2
(45) Date of Patent: Dec. 2, 2008

(54) GENERALIZED INERTIAL MEASUREMENT ERROR REDUCTION THROUGH MULTIPLE AXIS ROTATION DURING FLIGHT

(75) Inventor: Robert H. Fall, St. Petersburg, FL (US)

(73) Assignee: Honeywell International Inc., Morristown, NJ (US)

(*) Notice: Subject to any disclaimer, the term of this patent is extended or adjusted under 35 U.S.C. 154(b) by 193 days.

(21) Appl. No.: 11/004,517

(22) Filed: Dec. 3, 2004

(65) Prior Publication Data

US 2006/0053887 A1 Mar. 16, 2006

Related U.S. Application Data

(60) Provisional application No. 60/608,819, filed on Sep. 10, 2004.

(51) Int. Cl.
*G01P 3/04* (2006.01)

(52) U.S. Cl. ............... 73/510; 73/1.78; 73/514.15; 73/514.01; 33/326

(58) Field of Classification Search ............ 73/514.15, 73/514.01, 510, 1.78; 244/3.2; 701/220; 33/326

See application file for complete search history.

(56) References Cited

U.S. PATENT DOCUMENTS

| | | |
|---|---|---|
| 1,315,735 A | 9/1919 | Michell |
| 2,363,260 A | 11/1944 | Peskin |
| 2,710,234 A | 6/1955 | Hansen |
| 2,959,060 A | 11/1960 | Kunz |
| 2,999,391 A * | 9/1961 | Freebairn et al. ......... 74/5.37 |
| 3,039,316 A * | 6/1962 | Slater ................... 74/5.34 |
| 3,056,303 A | 10/1962 | Naylor |
| 3,258,977 A * | 7/1966 | Hoffman ................ 74/5.34 |
| 3,269,195 A * | 8/1966 | Cahoon et al. ............. 74/5.4 |
| 3,328,595 A | 6/1967 | Todd, Jr. |
| 3,365,942 A | 1/1968 | Blazek |
| 3,439,546 A | 4/1969 | Baker et al. |
| 3,572,856 A | 3/1971 | McHugh |
| 3,576,124 A | 4/1971 | O'Connor |
| 3,670,585 A | 6/1972 | Alexander et al. |

(Continued)

FOREIGN PATENT DOCUMENTS

GB 866473 4/1961

(Continued)

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

(Continued)

*Primary Examiner*—Daniel S. Larkin
*Assistant Examiner*—Samir M. Shah
(74) *Attorney, Agent, or Firm*—Fogg & Powers LLC

(57) ABSTRACT

An inertial measurement unit is provided. The inertial measurement unit comprises two rotational axes, wherein a first of the two rotational axes is aligned nominally along a thrust axis and a second of the two rotational axes is aligned substantially perpendicular to a plane formed by a local gravity vector and a thrust vector, and one or more sensors which rotate about the second rotational axis.

25 Claims, 4 Drawing Sheets

U.S. PATENT DOCUMENTS

| | | | |
|---|---|---|---|
| 3,769,710 A | | 11/1973 | Relster |
| 3,782,167 A | | 1/1974 | Stuelpnagel |
| 3,938,256 A | * | 2/1976 | Crocker, Jr. ............... 33/324 |
| 4,003,265 A | | 1/1977 | Craig et al. |
| 4,143,466 A | | 3/1979 | Quermann |
| 4,150,579 A | | 4/1979 | Vaughn |
| 4,214,482 A | * | 7/1980 | Bouchard ............... 73/504.09 |
| 4,244,215 A | * | 1/1981 | Frosch et al. ............. 73/178 R |
| 4,291,926 A | | 9/1981 | Tomioka et al. |
| 4,413,864 A | | 11/1983 | Phillips |
| 4,458,426 A | * | 7/1984 | O'Connor et al. ............. 33/325 |
| 4,488,041 A | | 12/1984 | Baudot |
| 4,515,486 A | | 5/1985 | Ide |
| 4,671,650 A | | 6/1987 | Hirzel et al. |
| 4,711,125 A | | 12/1987 | Morrison |
| 4,723,735 A | | 2/1988 | Eisenhaure et al. |
| 4,822,181 A | | 4/1989 | Egli |
| 4,917,330 A | | 4/1990 | Dulat et al. |
| 5,067,084 A | | 11/1991 | Kau |
| 5,088,825 A | | 2/1992 | Derry et al. |
| 5,099,430 A | | 3/1992 | Hirsch |
| 5,115,570 A | * | 5/1992 | Krogmann et al. ........... 33/326 |
| 5,319,577 A | | 6/1994 | Lee |
| 5,357,437 A | | 10/1994 | Polvani |
| 5,396,326 A | * | 3/1995 | Knobbe et al. .............. 356/255 |
| 5,410,232 A | | 4/1995 | Lee |
| 5,710,559 A | | 1/1998 | Krogmann |
| 5,716,142 A | | 2/1998 | Kristensen et al. |
| 5,743,654 A | | 4/1998 | Ide et al. |
| 5,790,049 A | | 8/1998 | Harrell |
| 5,894,323 A | | 4/1999 | Kain et al. |
| 6,145,393 A | | 11/2000 | Canton |
| 6,172,665 B1 | | 1/2001 | Bullister |
| 6,481,672 B1 | * | 11/2002 | Goodzeit et al. ............. 244/169 |
| 6,594,623 B1 | | 7/2003 | Wang et al. |
| 6,594,911 B2 | * | 7/2003 | Brunstein et al. ............. 33/318 |
| 6,629,778 B1 | | 10/2003 | Enderle et al. |
| 6,711,952 B2 | | 3/2004 | Leamy et al. |
| 6,741,209 B2 | | 5/2004 | Lee |
| 6,786,084 B2 | | 9/2004 | Schroeder et al. |
| 6,802,221 B2 | | 10/2004 | Hedeen et al. |
| 6,826,478 B2 | | 11/2004 | Riewe et al. |
| 6,918,186 B2 | * | 7/2005 | Ash et al. ...................... 33/313 |
| 7,003,399 B1 | | 2/2006 | Chappell |
| 7,066,653 B2 | | 6/2006 | Dourlens et al. |
| 2002/0077189 A1 | | 6/2002 | Tuer et al. |
| 2003/0120425 A1 | | 6/2003 | Stanley et al. |
| 2004/0015323 A1 | | 1/2004 | Boyton |
| 2004/0075737 A1 | | 4/2004 | Kirby |
| 2004/0089083 A1 | | 5/2004 | Bailey |
| 2004/0212803 A1 | | 10/2004 | Siegl et al. |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |

OTHER PUBLICATIONS

El-Sheimy et al., "Structural Monitoring Using Wirelessly Connected Mems-Based Snesors-Towards System Development", Feb. 18, 2003, pp. 1-10, Publisher: ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

Ng, "The Optical Mouse as a Two-Dimensional Displacement Sensor", "Sensors and Actuators A", Oct. 1, 2003, pp. 21-25, vol. 107, No. 1, Publisher: Elseveier Sequoia S.A., Published in: Lausanne, CH.

* cited by examiner

GENERALIZED INERTIAL MEASUREMENT ERROR REDUCTION THROUGH MULTIPLE AXIS ROTATION DURING FLIGHT

CROSS REFERENCE TO RELATED APPLICATION

This application is related to, and claims the benefit of the filing date of U.S. Provisional Application No. 60/608,819, filed on Sep. 10, 2004.

This application is related to co-pending U.S. patent application Ser. No. 11/004,184, filed on Dec. 3, 2004, and entitled "GAS SUPPORTED INERTIAL SENSOR SYSTEM AND METHOD" (the '184 Application). The '184 Application is incorporated herein by reference.

This application is also related to the following applications filed on Dec. 3, 2004, all of which are hereby incorporated herein by reference:

U.S. patent application Ser. No. 11/004,531, entitled "SPHERICAL POSITION MONITORING SYSTEM," (the '531 Application);

U.S. patent application Ser. No. 11/004,759, entitled "ABSOLUTE POSITION DETERMINATION OF AN OBJECT USING PATERN RECOGNITION," (the '759 Application);

U.S. patent application Ser. No. 11/004,529, entitled "THREE DIMENSIONAL BALANCE ASSEMBLY," (the '529 Application);

U.S. patent application Ser. No. 11/004,452, entitled "ARTICULATED GAS BEARING SUPPORT PADS," (the '452 Application);

U.S. patent application Ser. No. 11/004,214, entitled "GAS JET CONTROL FOR INERTIAL MEASUREMENT UNIT," (the '214 Application);

U.S. patent application Ser. No. 11/004,177, entitled "RF WIRELESS COMMUNICATION FOR DEEPLY EMBEDDED AEROSPACE SYSTEMS," (the '177 Application; and U.S. patent application Ser. No. 11/004,743, entitled "PRECISE, NO-CONTACT POSITION SENSING USING IMAGING," (the '743 Application).

TECHNICAL FIELD

The following description relates to inertial guidance systems in general and to generalized inertial measurement error reduction in particular.

BACKGROUND

Typical inertial guidance systems employ various sensors to measure changes in motion. For example, a linear accelerometer is often used to measure acceleration along one linear axis. A combination of three separate linear accelerometers can measure acceleration in all three dimensions. These measurements of acceleration can then be integrated over time to determine the velocity and position of an object. Based on position and velocity readings, the object's trajectory is adjusted to arrive at a desired target. Inertial guidance systems place accelerometers on a platform also containing gyroscopes to measure or control the orientation of the accelerometers. The gyroscopes maintain the accelerometers in either a real physical or virtual computed inertial frame of reference by providing measures of the angular rotation in inertial space. The angular rotation information is then used to either control the orientation of the sensors so that they experience no rotation with respect to inertial space or to compute the orientation with respect to inertial space or to both control and compute the orientation. The type of inertial guidance system which controls the physical orientation of the sensors to remain rotationally fixed is commonly known as an inertially stabilized system. The type of inertial guidance system which computes the orientation of the sensors with respect to inertial space is commonly known as a strapdown system whether or not the unit remains rotationally fixed to the missile or aircraft. The control forces necessary to control the orientation of the gyroscopes and accelerometers can be obtained by providing appropriate torques to a gimbal set which contains the sensor cluster or to a freely suspended sphere which contains the instrument cluster. Applications of these inertial guidance systems can be found in many avionics systems such as missiles and commercial or military aircraft.

High accuracy inertial guidance systems such as those used in avionics systems can undergo high accelerations or input rates as well as experience gradual changes in offset or bias errors which are independent of the magnitude of the input. High accelerations or input rates lead to sensor errors that are often difficult to calibrate prior to flight and bias errors can trend after calibration to new values at flight. For example, errors in acceleration measurement can be due to accelerometer bias or high levels of acceleration driving scale factor nonlinearities. As the acceleration measurements are integrated to determine position and velocity, these acceleration errors will cause position and velocity errors that grow in time. Virtually all inertial guidance systems suffer from this problem of integration error growth.

For the reasons stated above and for other reasons stated below which will become apparent to those skilled in the art upon reading and understanding the present specification, there is a need in the art for a measurement unit which can reduce the errors in measurement due to both fixed and slowly changing errors.

SUMMARY

The above mentioned problems with errors in measurement are addressed by the present invention and will be understood by reading and studying the following specification.

In one embodiment, an inertial measurement unit is disclosed. The inertial measurement unit comprises two rotational axes, wherein a first of the two rotational axes is aligned nominally along a thrust axis and a second of the two rotational axes is aligned substantially perpendicular to a plane formed by a local gravity vector and a thrust vector, and three or more sensors, two of which are connected to and rotate about the second rotational axis.

In another embodiment, a method of reducing sensor errors in an inertial guidance system is disclosed. The method comprises aligning a first rotational axis nominally along a thrust axis, maintaining the alignment of a second rotational axis substantially orthogonal to a plane formed by a local gravity vector and a thrust vector, and modulating the acceleration sensed by one or more accelerometers.

In another embodiment, an inertial measurement unit is disclosed. The inertial measurement unit comprises a sphere adapted to be aligned nominally along a thrust axis and at least three accelerometers mounted within the sphere. Each accelerometer is aligned along associated orthogonal axes. The sphere rotates about an axis perpendicular to a plane of trajectory and the plane of trajectory is formed by a local gravity vector and a thrust vector along the thrust axis. The axes of two of the accelerometers are orthogonal and form a plane parallel to the plane of trajectory and the two accelerometers are adapted to sense acceleration along the thrust axis as they rotate within the plane of trajectory.

DRAWINGS

DETAILED DESCRIPTION

Figure 1:
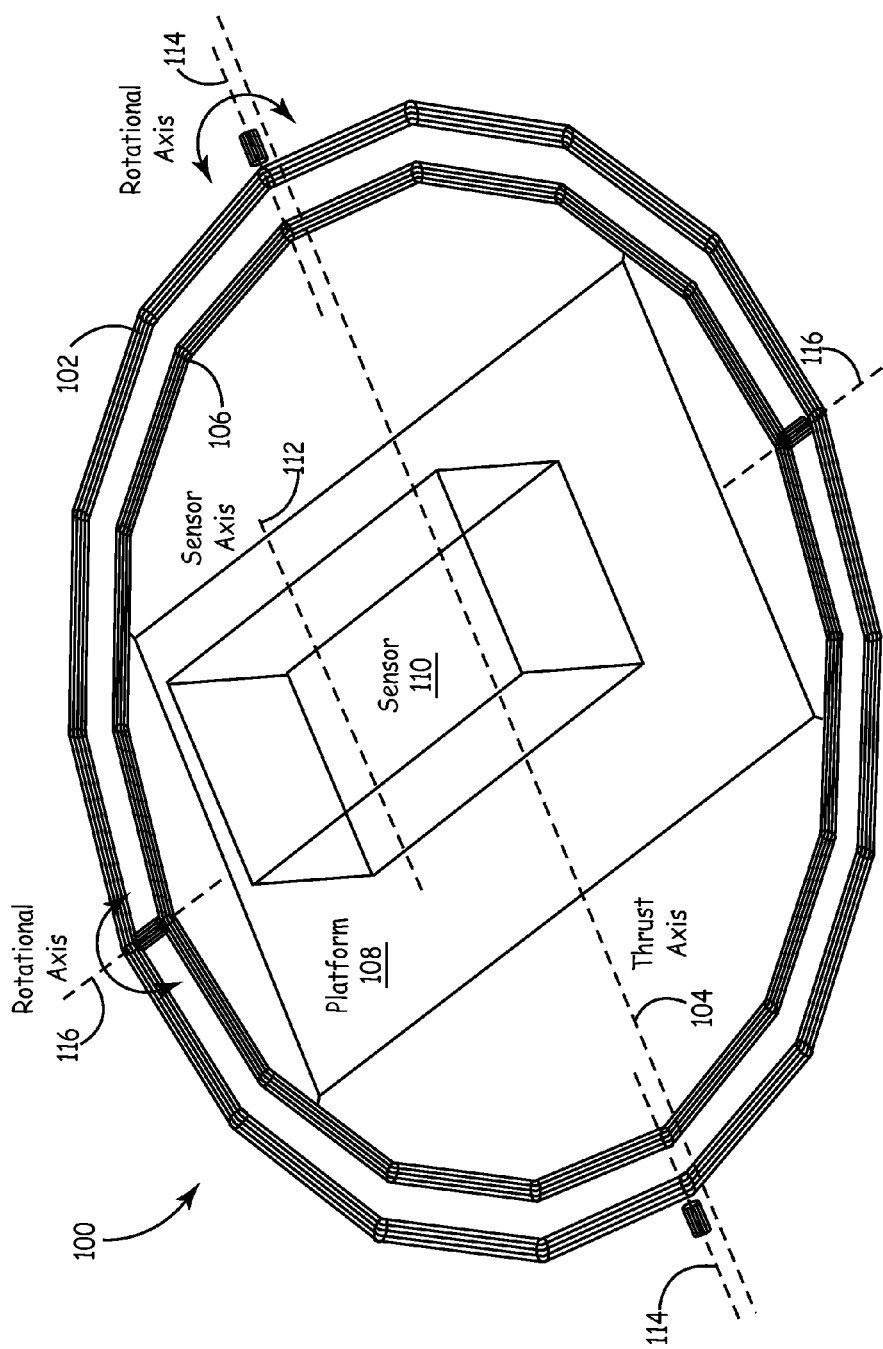
FIG. 1 is a diagram of one embodiment of a measurement unit for reducing errors in measurement which utilizes a gimbal set to position the sensor cluster.

In the following detailed description of the embodiments, reference is made to the accompanying drawings, which form a part hereof, and in which are shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims and equivalents thereof. Embodiments of the methods and apparatus described herein are used to significantly reduce the integrated navigation error (e.g. velocity, position, and angle) of any error that is constant or of an even power of the input. This includes accelerometer bias and scale factor quadratic terms, gyroscope rate bias and any quadratic rate scale factor non-linearities. In turn, this improves the accuracy of the inertial guidance system and the time and cost required for high accuracy calibration. Any inertial measurement until having either all attitude capability or the appropriate gimbal arrangement and suitable sensors can be made to operate in this error canceling mode.

Embodiments of the present invention provide at least one gimbal (hereafter referred to as Gimbal 1) that is capable of being aligned so that it is free to rotate nominally about a spacecraft or missile thrust axis during or prior to flight. Another gimbal within Gimbal 1 (hereafter referred to as Gimbal 2) is free to rotate at least 180 degrees and carries inertial sensors. During flight, the Gimbal 1 rotation axis, aligned approximately along the thrust axis, is used to control the Gimbal 2 rotation axis to be at right angles to the plane formed by the local gravity vector and the thrust vector. This is accomplished by presetting this alignment based on pre-set launch trajectory knowledge or by serving the sensed acceleration along the Gimbal 2 axis to a minimum during flight. Gimbal 2 is then rotated at a rate sufficient to provide multiple rotations during the thrust period. These are either continuous rotations or oscillating half rotations causing full position reversal of the accelerometer axis with respect to the Gimbal 1 axis. The inertial sensors must be capable of operating within the rotation rate applied by the inner gimbal. The resulting rotations modulate the combination of thrust and gravity sensed by the accelerometers in the plane normal to the Gimbal 2 rotation axis and the normally near constant errors now appear as small sinusoids in an inertial frame. These sinusoids have a very small integrated velocity error compared to the much larger integrated value of the near constant effects in an un-rotated sensor set.

Embodiments of the present invention provide an inertial measurement unit. In one embodiment, the inertial measurement unit includes a sphere containing a sensor cluster oriented such that the plane containing two orthogonal accelerometers is be aligned nominally so that it is parallel to a plane of trajectory, wherein said plane of trajectory is formed by a local gravity vector and a thrust vector along said thrust axis. The sphere is then made to rotate about an axis perpendicular to the plane of trajectory thereby causing the two orthogonal accelerometers to repetitively sense both positive and negative components of the thrust and gravity vectors.

Embodiments of the present invention provide a suitably designed inertial measurement unit that rotates around various axes for calibration prior to use and also maintains a rotation about the vertical axis prior to flight to improve alignment accuracy. Embodiments of the present invention then align themselves to rotate about an axis perpendicular to the instantaneous plane of a trajectory, thus improving velocity and position errors caused by accelerometer bias errors and high levels of thrust acceleration acting on quadratic scale factor non-linearities. These improvements reduce related integrated navigation errors up to approximately one hundredth of those of a fixed measurement unit.

FIG. 1 is a diagram of one embodiment of a measurement unit, shown generally at 100, for reducing errors in measurement according to the teachings of the present invention. Measurement unit 100 includes a first gimbal 102 and a second gimbal 106. Rotational axis 114 of Gimbal 102 is capable of being aligned nominally along thrust axis 104 (e.g. a thrust axis of a missile or spacecraft). In one embodiment, this alignment occurs prior to flight. In another embodiment, this alignment occurs during flight. Gimbal 106 is free to rotate at least 180 degrees about rotational axis 116. Attached to gimbal 106 is a platform 108 which carries one or more sensors 110. In one embodiment, the one or more sensors 110 are attached directly to gimbal 106 thus eliminating the need for platform 108.

Figure 4:
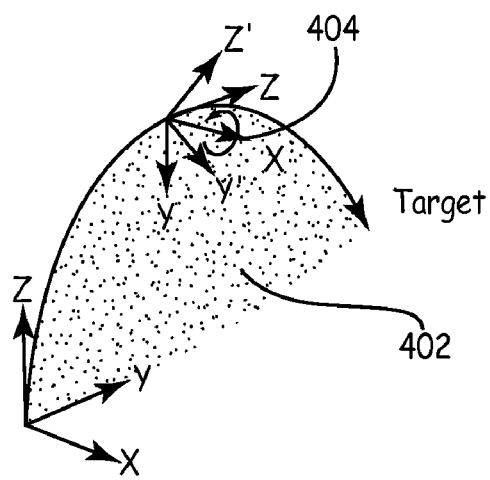
FIG. 4 is a diagram depicting the relation between a trajectory plane and rotation axis in one embodiment of a method for reducing measurement errors.

During flight, gimbal 102, with rotational axis 114 aligned approximately along thrust axis 104, is rotated to maintain rotational axis 116 of gimbal 106 at right angles to a plane formed by the local gravity vector and a thrust vector as shown in FIG. 4. In one embodiment, this alignment of rotational axis 116 of gimbal 106 is accomplished by presetting the alignment based on pre-set launch trajectory knowledge. In another embodiment, this alignment is accomplished by minimizing the sensed acceleration along rotational axis 116 of gimbal 106 during flight.

In order to reduce the acceleration error sensed by the one or more sensors 110, gimbal 106 will rotate sensors 110 at a sufficient rate to provide multiple rotations during a period of thrust. In one embodiment, these rotations consist of oscillating 180 degree rotations that cause full position reversal of sensor axis 112 with respect to thrust axis 104. In another embodiment, sensors 110 will continuously rotate 360 degrees. Sensors 110 must be capable of operating within the rotation rate applied by gimbal 106. The resulting rotations modulate the combination of thrust and gravity sensed by sensors 110 in a plane normal to rotational axis 116 of gimbal 106. The normally near constant errors which vary slowly with respect to the period of the sensor rotation now appear as small sinusoids in an inertial frame. These sinusoids have a very small integrated velocity error compared to the much larger integrated value of the near constant effects in an un-rotated sensor.

Figure 2:
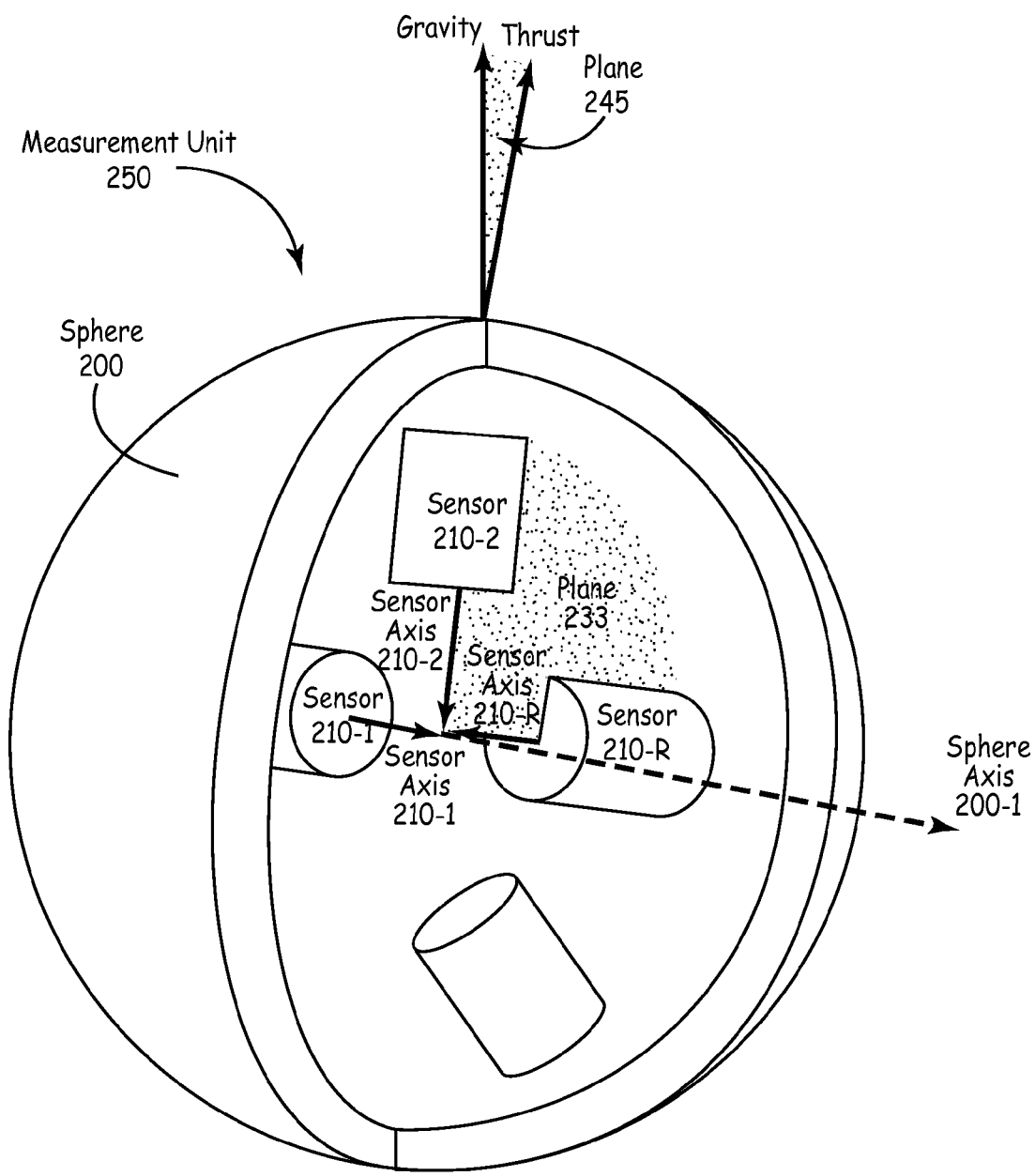
FIG. 2 is a diagram of another embodiment of a measurement unit for reducing errors in measurement which utilizes a freely rotating sphere to position the sensor cluster.

FIG. 2 is a diagram of another embodiment of a measurement unit 250 for reducing errors in measurement. Measurement unit 250 includes a sphere 200 containing one or more sensors 210-1 to 210-R. Sphere 200 is freely suspended to provide all attitude capability. In one embodiment, sphere 200 has rotational axis 200-1 capable of being at right angles to a plane formed by a local gravity vector and a thrust vector as shown in FIG. 4. In one embodiment, this alignment occurs prior to flight. In another embodiment, this alignment occurs during flight.

During flight, sphere 200, is rotated about sensor axis 210-1 which is also parallel to sphere axis 200-1 and at right angles to the plane 245 formed by a local gravity vector and a thrust vector which also is parallel to the plane 233 formed by orthogonal sensor axes 210-2 and 210-R. In one embodiment, this alignment of rotational axis 200-1 is accomplished by presetting the alignment based on pre-set launch trajectory knowledge. In another embodiment, this alignment is accomplished by minimizing the sensed acceleration along rotational axis 200-1 during flight.

In order to reduce the acceleration error sensed by the one or more sensors 210-1 to 210-R, sphere 200 will rotate sensors 210-1 to 210-R at a sufficient rate to provide multiple rotations during a period of thrust. In one embodiment, these rotations consist of oscillating 180 degree rotations that cause full position reversal of sensor axes 210-1 to 210-R with respect to thrust axis. In another embodiment, sensors 210-1 to 210-R will continuously rotate 360 degrees. Sensors 210-1 to 210-R must be capable of operating within the rotation rate applied to sphere 200. The resulting rotations modulate the combination of thrust and gravity sensed by sensors 210-2 to 210-R in a plane 245 normal to rotational axis 200-1 of sphere 200. The normally near constant errors now appear as small sinusoids in an inertial frame. These sinusoids have a very small integrated velocity error compared to the much larger integrated value of the near constant effects in an un-rotated sensor.

Figure 5:
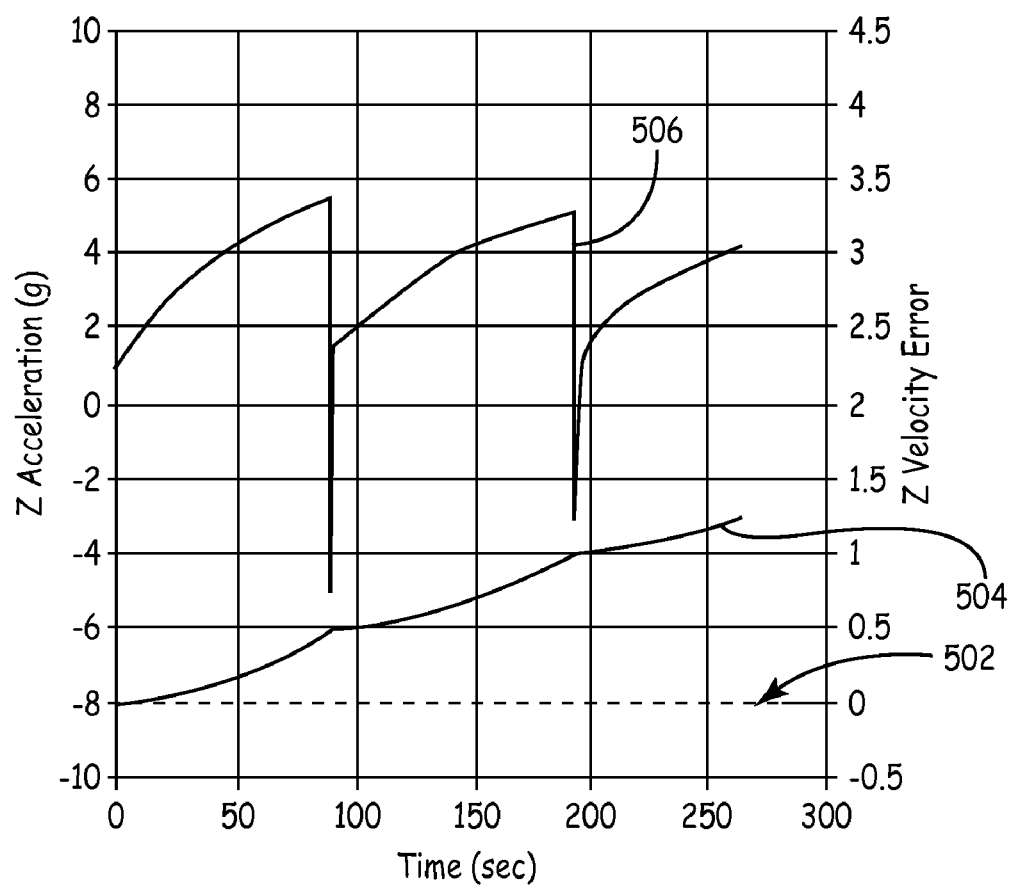
FIG. 5 is a graph depicting improvements in error reduction by using one embodiment of a method for reducing measurement errors.

Viable embodiments of an inertial measurement unit according to the teachings of the present invention can be utilized in an inertial navigation system of any moving vehicle. In particular, viable embodiments are preferably used in missile guidance systems. In operation in a missile guidance system, a first rotational axis (e.g. the rotational axis of the outer gimbal as in FIG. 1) will be aligned nominally along a thrust axis of the missile. A second rotational axis (e.g. the rotational axis of the inner gimbal in FIG. 1) will be aligned perpendicular to a plane of trajectory formed by a thrust vector along the thrust axis and a local gravity vector (as depicted by the shaded region in FIG. 4). Once launched, the missile will undergo different periods of thrust (i.e. acceleration) at various times throughout flight until reaching its target. Throughout flight, the second rotational axis will be maintained perpendicular to the plane of trajectory by rotating the inertial measurement unit about the first rotational axis. Acceleration sensors in the unit will be rotated about the second rotational axis. The sensors will be rotated in either continuous 360 degree rotations or in oscillating 180 degree rotations. In both types of rotations the sensors will experience complete position reversal with respect to the thrust axis. This rotation will switch the sign on any error in the acceleration detected by the sensors. As a result the error will appear as a small sinusoid when graphed rather than a nearly constant and increasing error as in un-rotated sensors. An exemplary graph of these errors is depicted in FIG. 5. During any thrust period, the sensors will rotated at a rate sufficient to provide multiple rotations during the thrust period. The acceleration sensed by the sensors will then be integrated to obtain velocity and position measurements. The missile trajectory will then be corrected, if necessary, depending on the velocity and position measurements in order for the missile to more accurately reach its target.

Figure 3:
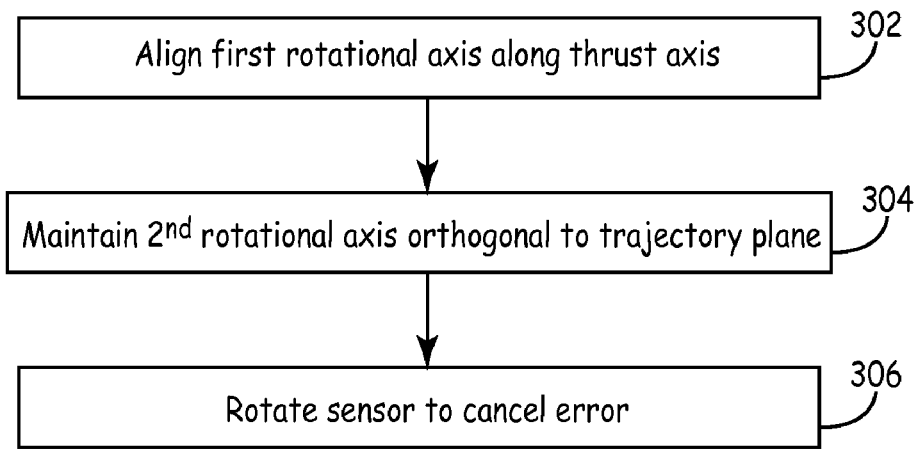
FIG. 3 is a block diagram of one embodiment of a method for reducing errors in measurement.

FIG. 3 is a block diagram of one embodiment of a method for reducing errors in measurement. The method begins at block 302. At block 302, a first rotational axis is aligned approximately along a thrust axis of moving object. In one embodiment, the moving object is a missile. At block 304, a second rotational axis is maintained approximately orthogonal to a trajectory plane composed of a gravity vector and thrust vector. The second rotational axis is maintained approximately orthogonal through rotations about the first rotational axis. Hence, both rotational axes are free to rotate independent of the other. At block 306, one or more sensors are rotated by the second rotational axis. In one embodiment, the one or more sensors are continuously rotated a full 360 degrees. In another embodiment, the rotation consists of oscillating 180 degree rotations such that the one or more sensors undergo a full position reversal with respect to the thrust axis. These rotations cancel the error in acceleration detected by switching the sign of the error. As a result, the near constant errors in an un-rotated sensor are changed to a small sinusoid. Hence, the integrated values for velocity and position also have a much smaller error than those integrated values in an un-rotated sensor. This method can be employed by any inertial measurement unit with all attitude capability or an appropriate gimbal arrangement such as the arrangement described above with respect to FIG. 1.

FIG. 4 is diagram depicting the relation between a trajectory plane and rotation axis in one embodiment of a method for reducing measurement errors. As depicted, rotational axis 404 is approximately orthogonal to the shaded trajectory axis 402. One or more sensors are rotated about rotational axis 404 causing a full position reversal of the one or more sensors with respect to a trajectory vector. The diagram is depicted using the moving object's frame as the frame of reference. Therefore, the Z axis is directed in the direction of movement of the moving object, i.e. a missile or spacecraft. The Z' and Y' axes represent rotated sensor coordinates.

FIG. 5 is a graph depicting improvements in error reduction by using one embodiment of a method for reducing measurement errors. Line 506 on the graph represents three different stages of thrust. Line 504 represents the error in velocity typically calculated by an un-rotated sensor. As can be seen, the error becomes progressively larger with each thrust. Line 502 shows the velocity error calculated by a sensor rotated according to the teachings of the present invention. As can be seen, the error is a very small sinusoid. Additionally, the error calculated does not increase with each thrust as in a typical un-rotated sensor.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An inertial measurement unit comprising:
a first gimbal adapted to be aligned nominally along a thrust axis;

a second gimbal, located within said first gimbal and adapted to be rotated about an axis substantially perpendicular to a plane of trajectory;

wherein said plane of trajectory is formed by a local gravity vector and a thrust vector along said thrust axis;

one or more sensors coupled to said second gimbal and adapted to sense acceleration along said thrust axis; and wherein the second gimbal rotates the one or more sensors when the inertial measurement unit is accelerating along the thrust axis to modulate thrust accelerations and gravity accelerations sensed by the one or more sensors.

2. The inertial measurement unit of claim 1 further comprising a platform adapted to support the one or more sensors.

3. The inertial measurement unit of claim 1 wherein the second gimbal rotates the one or more sensors in oscillations of at least 180 degrees.

4. The inertial measurement unit of claim 1 wherein the one or more sensors are adapted to operate within a rotation rate applied by the second gimbal.

5. The inertial measurement unit of claim 1 wherein the second gimbal is adapted to support a rotation rate sufficient to provide multiple rotations during a thrust period.

6. A method of reducing sensor errors in an inertial guidance system, the method comprising:

aligning a first rotational axis nominally along a thrust axis;

maintaining the alignment of a second rotational axis substantially orthogonal to a plane of trajectory formed by a local gravity vector and a thrust vector along said thrust axis; and rotating one or more accelerometers about an axis substantially perpendicular to the plane of trajectory to modulate thrust accelerations and gravity accelerations sensed by the one or more sensors.

7. The method of claim 6 wherein aligning a first rotational axis nominally along a thrust axis further comprises aligning the first rotational axis prior to movement of the system.

8. The method of claim 6 wherein aligning a first rotational axis nominally along a thrust axis further comprises aligning the first rotational axis during movement of the system.

9. The method of claim 6 wherein maintaining the second rotational axis substantially orthogonal to a plane further comprises rotating the first rotational axis aligned nominally along a thrust axis.

10. The method of claim 6 wherein maintaining the second rotational axis substantially orthogonal to a plane further comprises presetting the alignment based on pre-set launch trajectory knowledge.

11. The method of claim 6 wherein maintaining the second rotational axis substantially orthogonal to a plane further comprises minimizing the sensed acceleration along the second rotational axis during movement of the system.

12. The method of claim 6, wherein rotating the one or more accelerometers about the second rotational axis further comprises rotating the one or more accelerometers in oscillating 180 degree rotations.

13. The method of claim 6, wherein rotating the one or more accelerometers about the second rotational axis further comprises rotating the one or more accelerometers in continuous full 360 degree rotations.

14. The method of claim 6, wherein rotating the one or more accelerometers about the second rotational axis further comprises rotating the one or more accelerometers at a rate sufficient to provide multiple rotations during a thrust period.

15. The method of claim 6, wherein rotating the one or more accelerometers about the second rotational axis further comprises causing a full position reversal of the one or more accelerometers with respect to the thrust axis.

16. An inertial measurement unit comprising: two rotational axes, wherein a first of the two rotational axes is aligned nominally along a thrust axis and a second of the two rotational axes is aligned substantially perpendicular to a plane formed by a local gravity vector and a thrust vector; and three or more sensors, two sensors of which rotate about the second rotational axis to modulate thrust accelerations and gravity accelerations sensed by the two sensors.

17. The inertial measurement unit of claim 16 wherein the one or more sensors are rotated at least 180 degrees about the second rotational axis.

18. The inertial measurement unit of claim 16 wherein the one or more sensors are rotated in continuous full 360 degree rotations.

19. The inertial measurement unit of claim 16 wherein the inertial measurement unit is used in a missile guidance system.

20. The inertial measurement unit of claim 16 wherein the one or more sensors are adapted to operate within a rotation rate applied by rotating the one or more sensors about the second rotational axis.

21. The inertial measurement unit of claim 20 wherein the rotation rate applied by rotating the one or more sensors is sufficient to provide multiple rotations during a period of thrust.

22. An inertial measurement unit comprising:

a sphere having at least a first rotational axis and a second rotational axis, wherein the first rotational axis is nominally aligned along a thrust axis, and wherein the second rotational axis is maintained perpendicular to a plane of trajectory formed by a local gravity vector and a thrust vector along said thrust axis; and at least three accelerometers mounted within the sphere, wherein at least two accelerometers are aligned to sense acceleration along the thrust axis; and wherein the sphere is rotated about the second axis to modulate thrust accelerations and gravity accelerations sensed by the at least two sensors.

23. The inertial measurement unit of claim 22, wherein the sphere is rotated at least 180 degrees.

24. The inertial measurement unit of claim 22, wherein the sphere is freely suspended to provide all attitude capability.

25. The inertial measurement unit of claim 22, wherein axes of the at least two accelerometers are orthogonal and form a plane parallel to the plane of trajectory.

* * * * *